W. JONES.
PURIFICATION OF SEWAGE AND ANALOGOUS LIQUIDS.
APPLICATION FILED OCT. 18, 1915.
1,247,542.
Patented Nov. 20, 1917.
4 SHEETS—SHEET 1.
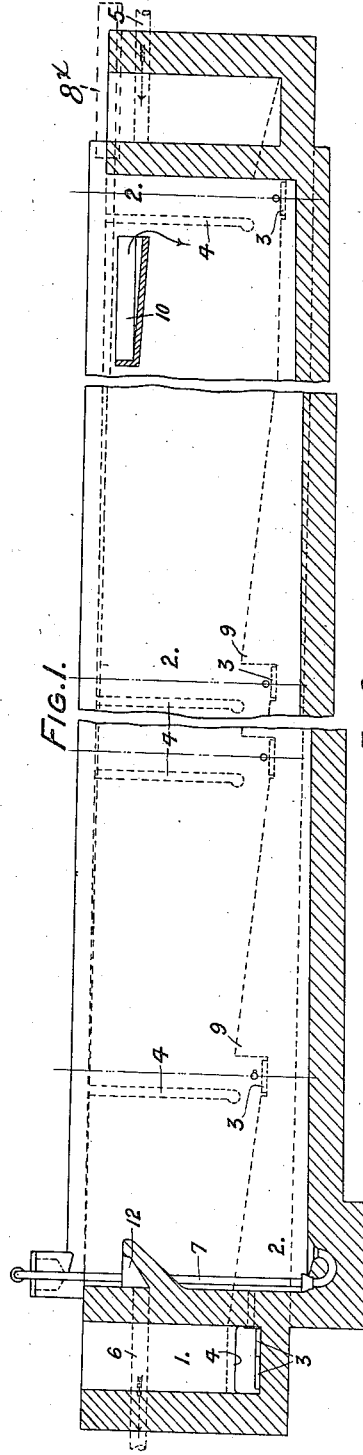
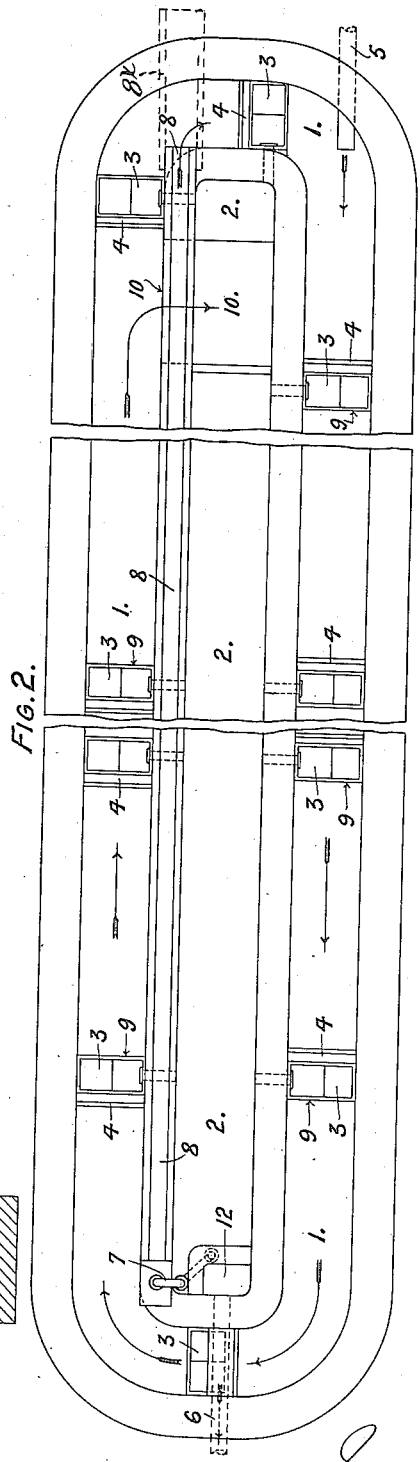
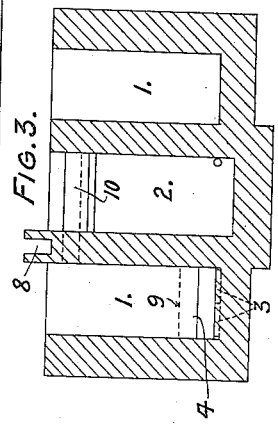
Inventor
W. Jones

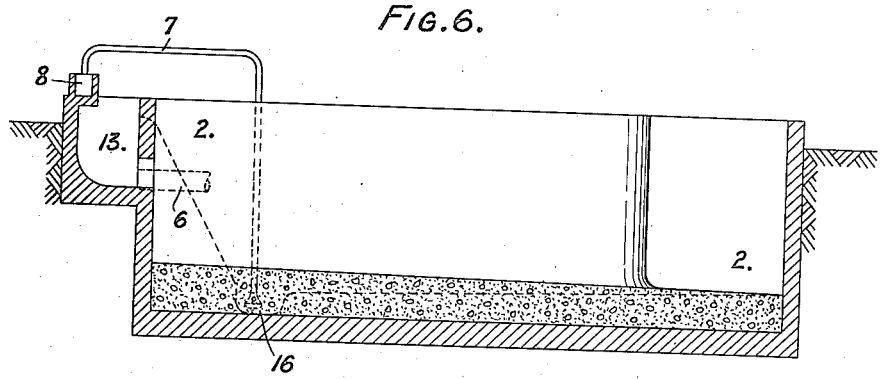
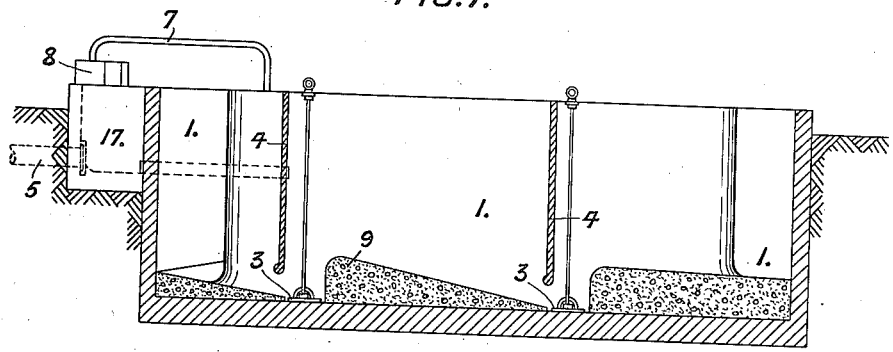

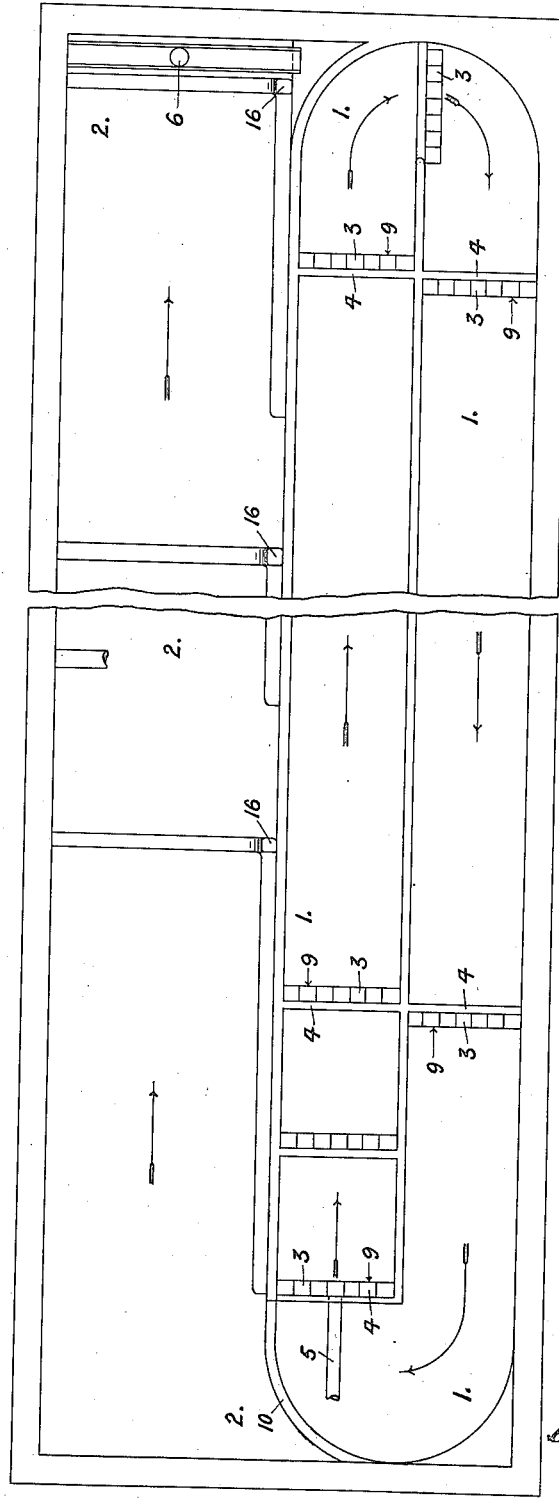

UNITED STATES PATENT OFFICE.

WALTER JONES, OF STOURBRIDGE, ENGLAND.

PURIFICATION OF SEWAGE AND ANALOGOUS LIQUIDS.

1,247,542.　　　　　　　Specification of Letters Patent.　　Patented Nov. 20, 1917.

Application filed October 18, 1915. Serial No. 56,535.

*To all whom it may concern:*

Be it known that I, WALTER JONES, a subject of the King of England, residing at Stourbridge, in the county of Worcester, England, have invented new and useful Improvements in and Connected with the Purification of Sewage and Analogous Liquids, of which the following is a specification.

This invention has reference to systems of purifying sewage and analogous liquids, in which the purification is effected by the action of aerobic bacteria, or other similar forms of germ life, upon the sewage or liquid; and it relates moreover, mainly to such systems wherein the sewage or liquid to be purified is introduced into a tank or vessel, and is together with sludge containing the bacteria or germ life, (and generally a large proportion of sludge—say 20% or over) subjected to the action of air delivered into it in small bubbles, such as those produced by forcing air through a porous stone or other air diffusing body.

In the carrying out of this process by the continuous fill and draw off operation, under this invention the tank will be of an endless type, and the crude sewage will be introduced into it at one part, and the purified effluent will be discharged at another part; and in one form, the tank is of channel form, with semi-circular ends, and its inside wall forming within it another tank, to which the treated or purified liquid, and any sludge carried over with it, will pass; and from which at a suitable point at the surface, the purified liquid will be drawn off, while the deposited sludge will be lifted from the bottom of this chamber or tank by an air lift back into the first or purifying tank. The liquid in the second tank will be quiescent, while that in the purifying tank will be continuously aerated and circulated, so as to be a homogeneous mixture.

The outer and treating tank or portion will be provided at certain distances apart, at the bottom, with air supply means or diffusers, and with curtain walls extending down into same to near the bottom, so that as the liquid flows under same, it becomes charged with air rising from the air supplying diffusers or means in the bottom, and thereby rendered lighter than the liquid above, and in consequence rises on this side of the curtain wall above the level of the liquid not so charged with air, and so produce a forward flow and circulation through the tank. Thus the liquid receives a succession of propelling actions, due to the air lightening and lifting effect, and thus the air serves as a pump or series of pumps, as well as an upward and downward circulating and distributing means, and in addition to its function as the medium of energizing and keeping up the active principle of the sludge life.

At one part of the treating tank, there is connected with it, at its upper part or level, a weir, say of a tray form, extending over the inner tank; and this weir portion will be connected with a part of the purifying tank in which there are no air supplying devices or diffusers, or where they are a large distance apart, so that in this part of the purifying tank the sludge will largely fall from the upper strata of the liquid, and only that liquid, from which the greater part of the sludge has precipitated, will pass out and by way of the weir, into the inner tank; which constitutes a precipitation tank and from the upper part of which, the clarified and purified liquid is continuously drawn off.

The inner tank may have an inclined bottom or sump; and the sludge which falls to the bottom, gravitates to the lowest point, and is forced from it by an air lift into the purifying tank; and it may be delivered at or near the inlet of raw sewage.

The discharge from the weir tray into the inner tank may be below the level of the liquid in the latter, or it may be at or near the surface.

If desired, the sludge lift, and the purified liquid outlet pipe or conduit—the mouth of which is at the liquid level—may be placed at the same part of the inner tank; in which case they should be at the end farthest away from the weir delivery.

The tank instead of being elongated with oval or curved ends, may have a plurality of zigzag courses, or it may be of annular form the inner portion forming the second tank.

Drawings illustrating the above arrangement and construction of purifying plant, and mode of operating are hereto annexed.

Figure 1 is a longitudinal section; Fig. 2 is a plan; and Fig. 3 a cross section through one arrangement, involving improvements hereunder.

Fig. 4, and Figs. 6 and 7 are longitudinal sections taken at the line BB and CC of Fig. 4 respectively of a modified arrangement of tanks or plant.

Fig. 8 is a plan showing another slight modification of the arrangement of tanks or plant.

Figure 4:
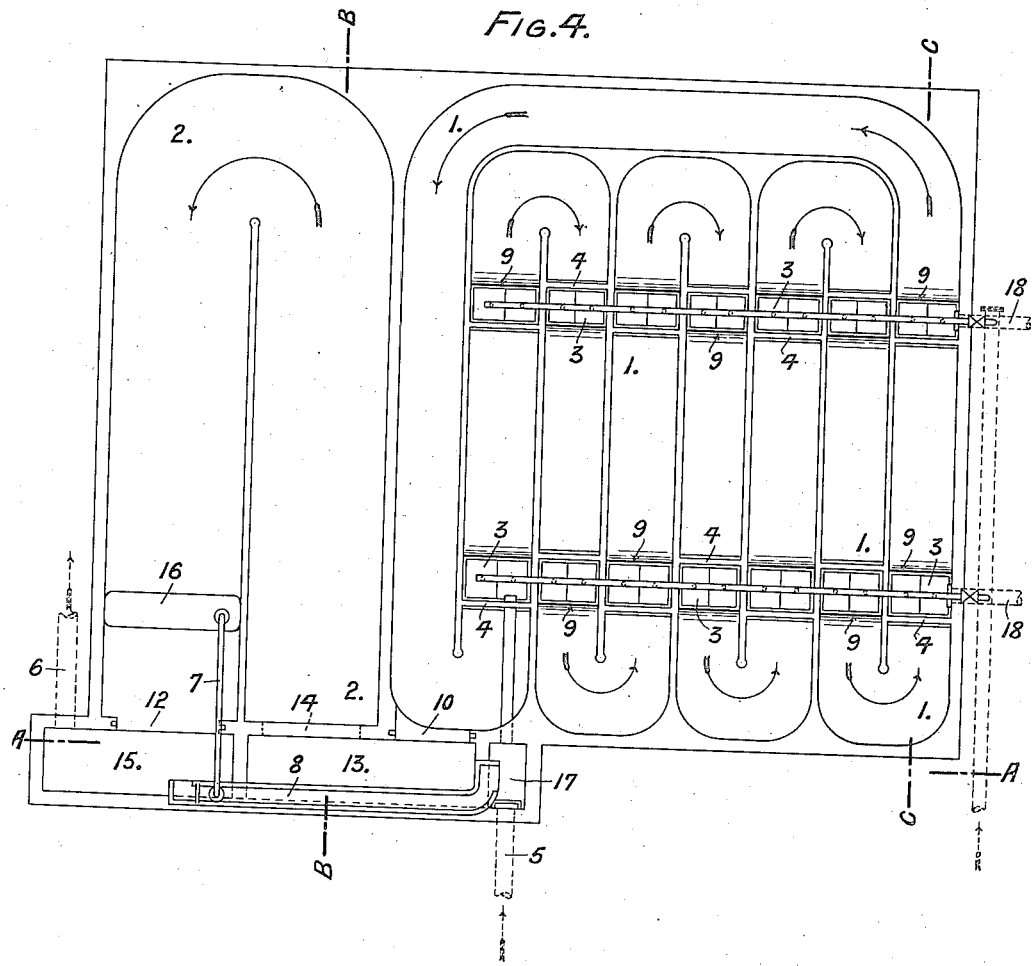
Fig. 4 is a plan.

Referring now to the drawing, 1 generally represents the tank or tanks of endless type in which the treatment is effected, and 2 represents the tank or chamber in which the deposition of the sludge takes place, and from which the purified and clarified effluent is carried off.

The air supplying diffusers or means for introducing air in fine bubbles into the liquid are marked 3, they being placed at the bottom of the tank; and 4 are the curtain walls disposed just on the up-stream side of the air suppliers 3, and depending down into the tank to a point near the bottom; but their lower edge may stand a relatively large distance from the bottom.

9 are projecting portions of the floors of the tank 1 on the down-stream side of the air supplying means 3; and between each of the curtains 4 and these parts 9, the air charged column of sewage will rise, and will be lifted above the normal level of liquid, due to its consisting of a combined volume of air and liquid.

5 is the raw sewage inlet pipe, and 6 is the clarified and purified effluent discharge pipe. 7 is the air-lift for elevating the sludge from the bottom of the depositing tank or chamber 2; and 8 is the conduit into which this sludge air-lift discharges, and which conducts the sludge back into the tank 1.

The weir over which the flow of fluid from the tank 1, into the tank 2, takes place, is marked 10.

In the arrangement shown in Figs. 1 to 3, the tank 1 is of endless form, consisting of two parallel channel portions relatively long to their width, and connected together at their ends; while the depositing tank 2 lies within the inner walls of this channel, and is also relatively narrow as shown.

The crude sewage is directed into one of the channels of the tank 1 about the center and near the top of same; and when it is full, the overflow passes through an opening in one of the inner walls on the weir 10, which is in the form of a tray, whence it falls down into the liquid at one end of this tank or chamber.

Between this weir and the air supplying means 3 on the up-stream side, a relatively long distance is left, as shown in Fig. 2, so that between this point and the weir an opportunity is given the liquid for the depositing of sludge.

The floor of the tank 2 is inclined, and in flowing from the inlet end to the other downward, the sludge deposits, and it gravitates toward the opposite end down the inclined bottom of the sump or inlet of the air-lift 7, when it is pumped by it into the channel 8, and is re-delivered into the sewage at the inlet end of the treating tank 1, just in advance of the inlet pipe 5.

The clarified sewage or effluent is carried off from the upper level of the liquid in the tank 2, by the weir 12, from which the discharge pipe 6 leads.

The effect of the air being supplied to the sewage or liquid from the bottom, between the vertical planes in which the curtains 4 and the raised portions 9, lie, is that the liquid receives a succession of propelling actions due to the lightening effect of the air and its lifting result; and so this arrangement constitutes so many pumps (as well as so many means of supplying the sewage with air for bacteriological purposes), and so forcing the sewage around and around the tank.

The portion or surplus of sludge over and above that required in the tank, which say is about 20% to 30% of the total contents or more, may be conducted away from the sludge conduit 8 by a separate pipe or trough or the like $8^x$ shown in dotted lines in Figs. 1 and 2, and delivered to any suitable place of deposit, this trough or pipe being adapted to be readily placed in position in connection with conduit 8 and removed therefrom as and when required.

The sludge which is re-transferred to the treating and purifying tank 1 is delivered into it near the point of crude sewage inlet, and to one of the diffusers 3, so that it is broken up and re-distributed again.

Figure 5:
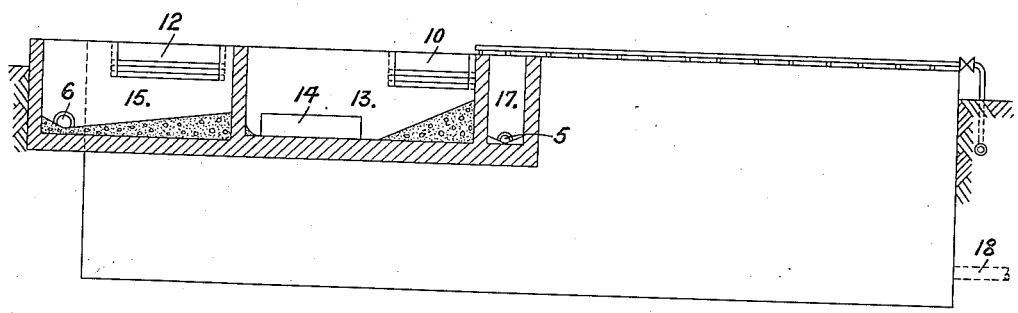
Fig. 5 is a cross section taken at the line AA

In the arrangement shown in Figs. 4 to 7, the tank 1 is continuous, but arranged in a zigzag manner, in which there are a plurality of parallel channel parts; and the depositing chamber or tank 2 is disposed at one side of same, and communicates with same by way of the weir 10, which may have removable boards in it, to raise and lower its sill level.

The liquid from the weir 10 first falls into the intermediate chamber 13, having an opening 14 at the bottom, opposite one end of the depositing tank 2; while at the opposite end, a clarified effluent discharge weir 12 is placed which discharges into the intercepting tank 15.

The sludge in this case is pumped by the air lift 7 from the sump 16 in the bottom of the tank 2 near the weir 12; and it is discharged into the gutter 8, which carries it into a supply sump 17, into which the crude sewage flows, and from which it passes into the first portion of the tank 1. In this sump 17 the mixing of the sludge and raw sewage takes place.

The tank 1 may have the sludge, or a portion of it, as may be desired, carried away from it by the pipes 18, the entrance of which will be at about the level of the air supplying means or diffusers 3, they being controlled by suitable valves or chambers;

and all of the diffusers in line connecting with one another at their surfaces by way of holes through the division walls.

In the modification shown in Fig. 8, the tank is largely of the type shown in Figs. 1 to 3, but the settling or sludge deposit tank 2 is arranged outside the tank 1, and parallel with the channels of same, instead of within same.

The bottom of the depositing tank 2, as set forth with reference to Figs. 1 to 3, is inclined from one end toward the other; but in this case Fig. 8, or in others, it may be assumed that the bottom is arranged in a plurality of inclined parts, similarly to the bottom of the tank 1; and that the sludge collects at the lowest portions of these sections, and flows toward the sumps 16, from whence it is lifted and re-delivered into the tank 1 at a suitable part.

What is claimed is:—

1. The process of purifying sewage or analogous liquids, consisting in aerating or oxidizing the liquid while in flow, and subsequently depositing the sludge or solid matters in its flow.

2. The process of purifying sewage or analogous liquids, consisting in aerating or oxidizing the liquid while in flow, subsequently depositing the sludge or solid matters in its flow, and transferring deposited sludge or solid matters to the portion of the liquid being aerated or oxidized.

3. The process of purifying sewage or analogous liquids, consisting in aerating or oxidizing the liquid while in flow, subsequently depositing the sludge or solid matters in its flow, and transferring a part only of the deposited sludge or solid matters to the portion of the liquid being aerated or oxidized; and removing the part or proportion in excess of that required in the treatment from the system.

4. The process of purifying sewage or analogous liquids, consisting in supplying crude sewage or liquid, causing it to flow while being treated, delivering air into the liquid in the presence of bacterial sludge or solid matter, depositing the sludge at a point of its flow, removed from that where the aeration or oxidation is taking place, and transferring deposited sludge or solid matters to the sewage or liquid in the aerating or oxidizing portion.

5. The process of purifying sewage or analogous liquids, consisting in continuously supplying crude sewage or liquid and causing it to flow, aerating or oxidizing the same, depositing the sludge or solid matters from the liquid at a point where the liquid is not being aerated, continuously removing the treated liquid, and transferring deposited sludge or solid matters to the liquid at the part where it is being aerated or oxidized.

6. The process of purifying sewage or analogous liquids consisting in continuously supplying crude sewage or liquid, causing it to flow, aerating or oxidizing the same at one part, depositing some of the sludge at one part, depositing some of the sludge or solid matters where the liquid is not being aerated and is quiet, continuously removing the top liquid from the part from which the said sludge has been deposited, causing this removed liquid to flow quietly without aeration or agitation, depositing the sludge from this removed liquid, removing the liquid thus clarified, and transferring deposited sludge or solid matters back into the aeration or oxidizating part.

7. The process of purifying sewage or analogous liquids consisting in continuously supplying crude sewage or liquid, causing it to flow, aerating or oxidizing the same at one part, depositing some of the sludge or solid matters where the liquid is not being aerated and is quiet, continuously removing the top liquid from the part from which the said sludge has been deposited, causing this removed liquid to flow quietly without aeration or agitation, depositing the sludge from this removed liquid.

8. The process of purifying sewage or analogous liquids, consisting in supplying crude sewage or liquid, causing it to flow, aerating or oxidizing and mixing it, depositing sludge or solid matters at a part where the liquid is not being aerated or mixed, removing the liquid from which sludge or solid matter has been deposited at this part, and transferring deposited sludge or solid matters to the liquid at the point where it is being aerated or oxidized.

9. The process of purifying sewage or analogous liquids consisting in circulating and aerating or oxidizing the liquid simultaneously, and agitating the liquid at a part while circulating by particles of air discharged into its lower part so as to keep the sludge intermixed with the liquid, while at another part the liquid is not supplied with air and is in quiet flow, depositing sludge at this part, removing the clarified liquid, and transferring deposited sludge or solid matters back to the agitated circulating part.

In testimony whereof I have signed my name to this specification in the presence of two subscribing witnesses.

WALTER JONES.

Witnesses:
ARTHUR BUTWELL,
WILLIAM E. HAND.